US011248490B2

(12) United States Patent
Galle et al.

(10) Patent No.: US 11,248,490 B2
(45) Date of Patent: Feb. 15, 2022

(54) THERMALLY RESPONSIVE COOLING FLOW METERS (71) Applicant: UNITED TECHNOLOGIES CORPORATION, Farmington, CT (US)

(72) Inventors: Nathan K. Galle, Portland, ME (US); Brian C. McLaughlin, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 664 days.

(21) Appl. No.: 16/004,687

(22) Filed: Jun. 11, 2018

(65) Prior Publication Data
US 2019/0376414 A1   Dec. 12, 2019

(51) Int. Cl.
F01D 25/12   (2006.01)
F02C 7/12   (2006.01)

(52) U.S. Cl.
CPC .............. F01D 25/12 (2013.01); F02C 7/12 (2013.01); F05D 2220/323 (2013.01); F05D 2260/20 (2013.01)

(58) Field of Classification Search
CPC .......... F01D 25/12; F01D 11/24; F01D 25/14; F02C 7/12; F02C 6/08; F02C 7/18; F02C 9/18; F05D 2220/323; F05D 2260/20; F05D 2300/505
See application file for complete search history.

(56) References Cited

U.S. PATENT DOCUMENTS

| 3,078,671 | A | * | 2/1963 | Senser | F02C 6/003 60/39.37 |
| 3,440,877 | A | | 4/1969 | Kovats | |
| 4,217,755 | A | | 8/1980 | Williams | |
| 4,487,016 | A | | 12/1984 | Schwarz et al. | |
| 4,805,398 | A | * | 2/1989 | Jourdain | F02C 7/18 60/806 |
| 5,263,643 | A | | 11/1993 | Wells et al. | |
| 6,485,255 | B1 | | 11/2002 | Care et al. | |
| 9,261,022 | B2 | | 2/2016 | Saha et al. | |
| 10,352,194 | B2 | * | 7/2019 | Varney | F16C 27/00 |
| 2010/0237571 | A1 | * | 9/2010 | Durocher | F16J 15/0887 277/631 |
| 2014/0003920 | A1 | | 1/2014 | Scott | |
| 2014/0140827 | A1 | * | 5/2014 | Hagan | F02C 7/28 415/174.5 |
| 2016/0131035 | A1 | | 5/2016 | Iaz et al. | |

(Continued)

FOREIGN PATENT DOCUMENTS

EP   3273009   1/2018
GB   2301169   11/1996

OTHER PUBLICATIONS

European Patent Office, Partial European Search Report dated Apr. 24, 2020 in Application No. 19179398.3.

Primary Examiner — Todd E Manahan
Assistant Examiner — Rodolphe Andre Chabreyrie
(74) Attorney, Agent, or Firm — Snell & Wilmer L.L.P.

(57) ABSTRACT

A thermally responsive flow meter may comprise a coil and a plate coupled to the coil. The plate may define a first airflow aperture. The plate may translate in a circumferential direction in response to a thermal expansion of the coil. The thermally responsive flow meter may regulate the flow of air through a second airflow aperture.

20 Claims, 7 Drawing Sheets (56) References Cited

U.S. PATENT DOCUMENTS

2017/0198600 A1 7/2017 Propheter-Hinckley et al.
2017/0234447 A1 8/2017 Jennings et al.
2017/0350265 A1 12/2017 McLaughlin et al.

* cited by examiner

THERMALLY RESPONSIVE COOLING FLOW METERS

FIELD

The present disclosure relates to flow meters, and more specifically, to thermally responsive flow meters for gas turbine engines.

BACKGROUND

Gas turbine engines typically include at least a compressor section to pressurize inflowing air, a combustor section to burn a fuel in the presence of the pressurized air, and a turbine section to extract energy from the resulting combustion gases. Gas turbine engines may have various secondary airflow streams to provide cooling air to gas turbine engine components including, for example, stator vane assemblies and/or rotor assemblies in the turbine section. The amount of cooling flow provided to these components may be designed to accommodate the hottest engine operating conditions (i.e., greatest temperatures).

SUMMARY

A thermally responsive flow meter is disclosed herein. In accordance with various embodiments, the thermally responsive flow meter may comprise a coil and a plate coupled to the coil. The plate may define a first airflow aperture. The plate may be configured to translate in a circumferential direction in response to a thermal expansion of the coil.

In various embodiments, the plate may comprise an annular structure including an inner diameter and an outer diameter radially outward of the inner diameter. The coil may be located at the outer diameter of the plate. In various embodiments, a flange may extend radially outward from a first end of the coil.

In various embodiments, a housing may be disposed around the plate and the coil. A first face of the housing may define a second airflow aperture. In various embodiments, the coil may be located between the plate and a second face of the housing. The coil may bias the plate toward the first face of the housing. An axle may extend between the first face of the housing and the second face of the housing. The coil may be configured to translate the plate about the axle.

An engine section of a gas turbine engine is also disclosed herein. In accordance with various embodiments, the engine section may comprise a flow guide configured to receive a cooling airflow, and a thermally responsive flow meter coupled to the flow guide. The flow guide may define a first airflow aperture. The thermally responsive flow meter may define a second airflow aperture. The thermally responsive flow meter may be configured to translate the second airflow aperture in a circumferential direction in response to a change in temperature of the cooling airflow.

In various embodiments, the thermally responsive flow meter may be configured to align the second airflow aperture with the first airflow aperture at a first flight condition and to misalign the second airflow aperture relative the first airflow aperture at a second flight condition. The first flight condition may comprise a take-off condition and the second flight condition may comprise a cruise condition.

In various embodiments, the thermally responsive flow meter may comprise a coil and a plate coupled to the coil. The plate may define the second airflow aperture. Thermal expansion of the coil may result in a circumferential translation of the plate.

In various embodiments, the coil may be located at an outer diameter of the plate. A flange may extend from the coil. A slot defined by the flow guide may engage the flange.

In various embodiments, the thermally responsive flow meter may further comprise a housing located around the coil and the plate. In various embodiments, the housing may be press fit within the first airflow aperture.

A gas turbine engine is also disclosed herein. In accordance with various embodiments, the gas turbine engine may comprise a combustor section and a turbine section downstream of the combustor section. The turbine section may comprise a flow guide configured to receive an airflow and defining, at least, a portion of an airflow path through the turbine section, and a thermally responsive flow meter coupled to the flow guide. The flow guide may further define a first airflow aperture. The thermally responsive flow meter may define a second airflow aperture. The thermally responsive flow meter may be configured to translate the second airflow aperture in response to a change in temperature of the airflow.

In various embodiments, the thermally responsive flow meter may comprise a coil and a plate coupled to the coil. The plate may define the second airflow aperture. Thermal expansion of the coil may result in a circumferential translation of the plate.

In various embodiments, a first surface of the flow guide may restrict radially outward translation of the coil. The first surface may extend circumferentially about the flow guide. A second surface of the flow guide may restrict radially inward translation of the plate. The second surface may extend circumferentially about the flow guide.

In various embodiments, the coil may be located over a first radially extending surface of the plate. In various embodiments, the thermally responsive flow meter may further comprise a housing disposed around the coil and the plate. The coil may be configured to bias the plate toward a radially extending face of the housing. The radially extending face may define a third airflow aperture.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, coupled, connected or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Gas turbine engines of the present disclosure may include thermally responsive flow meters. In various embodiments, the thermally responsive flow meters may be configured to regulate a flow of cooling air through a section of the gas turbine engine based on the engine operating condition. The thermally responsive flow meters may include a coil configured to thermally expand and contract in response to changes in engine operating temperature. In various embodiments, the thermally responsive flow meters may increase cooling flow at hotter operating temperatures and decrease cooling flow at cooler operating temperatures. Reducing the amount of air dedicated to cooling may increase the volume of air available for use in the engine core for power generation, which may increase engine and fuel efficiency.

Figure 1:
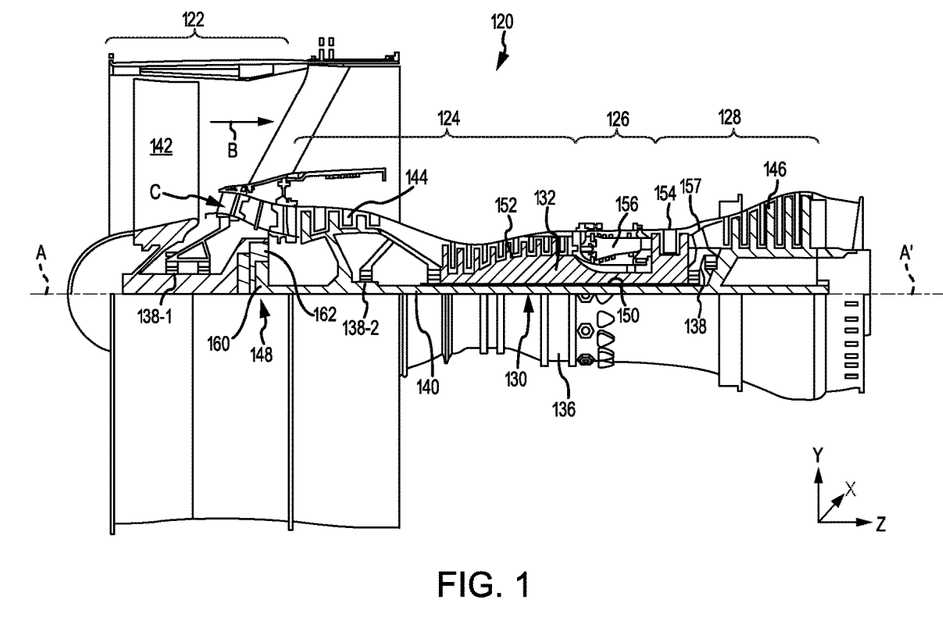
FIG. 1 illustrates a cross-section view of a gas turbine engine, in accordance with various embodiments.

In accordance various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. In operation, fan section 122 may drive air along a bypass flow-path B, while compressor section 124 may further drive air along a core flow-path C for compression and communication into combustor section 126, and then expansion through turbine section 128. Although depicted as a turbofan gas turbine engine 120 herein, it should be understood that the concepts described herein are not limited to use with turbofans as the teachings may be applied to other types of turbine engines including multi-spool architectures, as well as industrial gas turbines.

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). Engine central longitudinal axis A-A' is oriented in the z direction (axial direction) on the provided xyz axes. The y direction on the provided xyz axes refers to the radial direction and the x direction on the provided xyz axes refers to the circumferential direction. It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure compressor 144, and a low pressure turbine 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 and high pressure turbine 154. A combustor 156 may be located between HPC 152 and high pressure turbine 154. In various embodiments, engine static structure 136 may include a mid-turbine frame 157. The mid-turbine frame 157, if included, may be located generally between high pressure turbine 154 and low pressure turbine 146. Mid-turbine frame 157 may support one or more bearing systems 138 in turbine section 128. Inner shaft 140 and outer shaft 150 may be concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

In various embodiments, the air along core flow-path C may be compressed by low pressure compressor 144 and HPC 152, mixed and burned with fuel in combustor 156, and expanded over high pressure turbine 154 and low pressure turbine 146. Low pressure turbine 146 and high pressure turbine 154 may rotationally drive low speed spool 130 and high speed spool 132, respectively, in response to the expansion. Low pressure compressor 144, high pressure compressor 152, low pressure turbine 146, and high pressure turbine 154 may each comprise one or more stages or sets of rotating blades and one or more stages or sets of stationary (i.e., non-rotating) vanes axially interspersed with the rotating blade stages.

Figure 2:
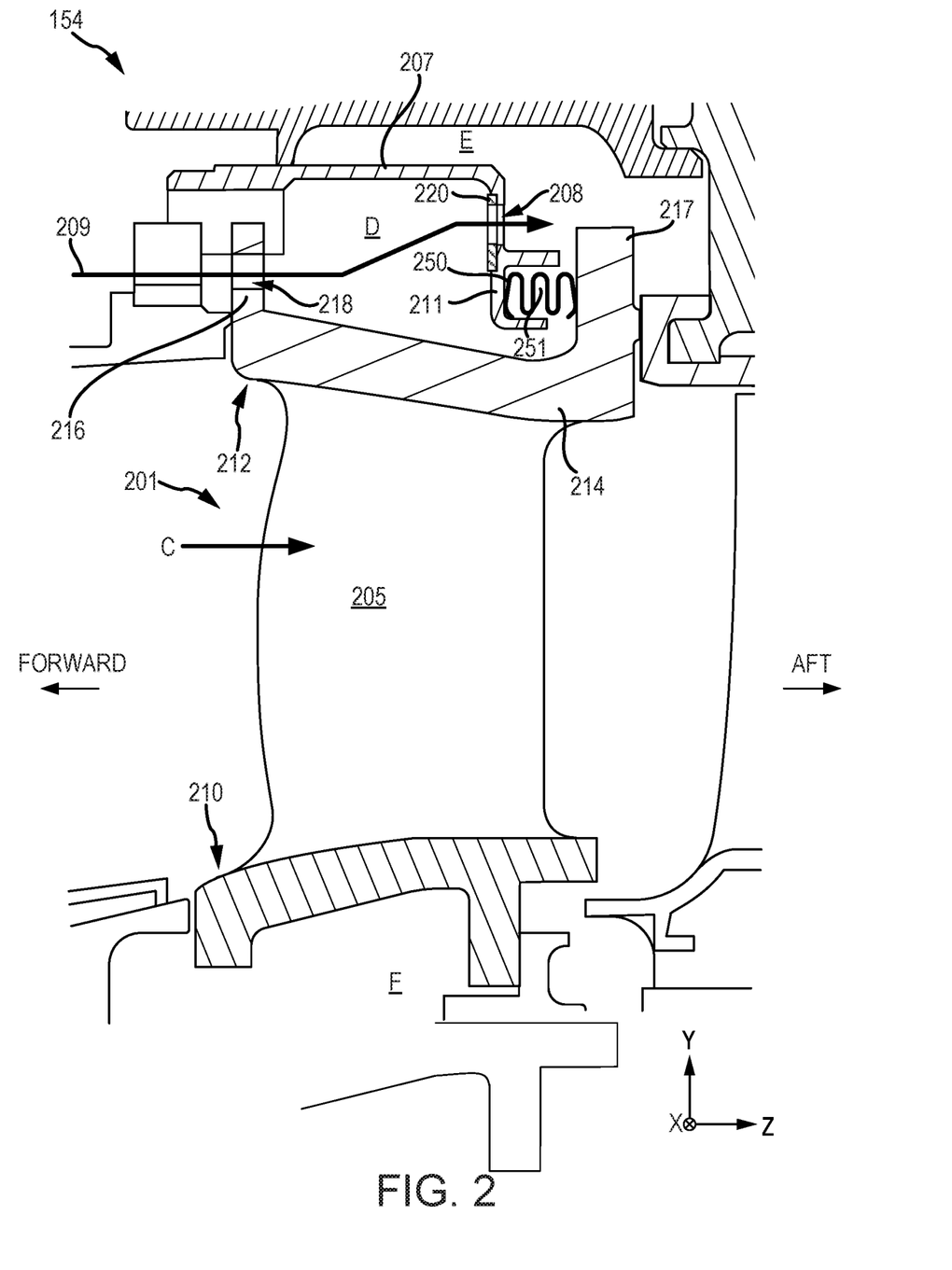
FIG. 2 illustrates a cross-section view of a high pressure turbine section of a gas turbine engine having a thermally responsive flow meter, in accordance with various embodiments.

With reference to FIG. 2, a section of high pressure turbine 154 of FIG. 1 is depicted, in accordance with various embodiments. High pressure turbine 154 may comprise a stator vane assembly 201. Stator vane assembly 201 may comprise a stator vane 205 configured to direct airflow through high pressure turbine 154. Stator vane 205 may be coupled at a first end to an inner diameter (ID) stator vane rail 210 and at a second end to an outer diameter (OD) stator vane rail 212. In various embodiments, stator vane 205 may be the first forward stator vane located in high pressure turbine 154. ID stator vane rail 210 may be radially spaced apart from OD stator vane rail 212. OD stator vane rail 212 may form a portion of an outer core engine structure, and ID stator vane rail 210 may form a portion of an inner core engine structure to at least partially define an annular core gas flow path through high pressure turbine 154. Stator vane 205, ID stator vane rail 210, and OD stator vane rail 212 may comprise any suitable material, such as, for example, an age-hardenable, nickel-based superalloy.

In various embodiments, ID stator vane rail 210 may be configured to direct an ID cooling airflow to provide cooling air to ID engine components (such as, for example, blades, blade outer air seals (BOAS), vane supports, seals, cases, and/or the like). An ID plenum F may be located radially inward from ID stator vane rail 210.

In various embodiments, OD stator vane rail 212 may comprise an outer platform 214, an OD forward rail 216, and an OD aft rail 217. OD forward rail 216 may be located forward of OD aft rail 217. OD forward rail 216 may comprise a forward rail airflow aperture 218 configured to receive a cooling airflow from, for example, compressor section 124, with momentary reference to FIG. 1.

In various embodiments, with continued reference to FIG. 2, high pressure turbine 154 may also comprise an OD seal 250. OD seal 250 may be disposed within an OD annular cavity 251. A secondary flow cavity E may be located radially outward from OD seal 250.

In various embodiments, high pressure turbine 154 may include a flow guide 207. Flow guide 207 may be configured to direct a cooling airflow along the outer diameter of high pressure turbine 154. In that regard, flow guide 207 and OD stator vane rail 212 may define a secondary airflow path 209 to allow cooling air to flow through high pressure turbine 154 and cool OD engine components (such as, for example, an OD BOAS). Flow guide 207 and OD stator vane rail 212 may define a plenum D. The cooling air may flow through secondary airflow path 209 by passing through forward rail airflow aperture 218, through a vane support airflow aperture 208 in flow guide 207, and over OD aft rail 217.

In various embodiments, high pressure turbine 154 may include a thermally responsive flow meter 220 located proximate airflow aperture 208. Thermally responsive flow meter 220 may be coupled to a radially extending portion 211 of flow guide 207. Thermally responsive flow meter 220 may be configured to regulate air flow through airflow aperture 208. In this regard, thermally responsive flow meter 220 may aid in metering the volume and/or flow rate of air entering secondary flow cavity E and being provided to downstream engine components.

During operation, increases in engine power and in the temperature of the air in core flow-path C may cause the temperature of cooling air in secondary airflow path 209 to increase. In response to increases in the temperature of cooling air in secondary airflow path 209, thermally responsive flow meter 220 may translate, for example, in a first circumferential direction, to allow an increased volume of cooling air to flow through airflow aperture 208. In response to decreases in the temperature of cooling air in secondary airflow path 209, thermally responsive flow meter 220 may translate in a second, opposite circumferential direction to decrease the amount of cooling air flowing through airflow aperture 208. In this regard, thermally responsive flow meter 220 may be installed and/or configured such that at the hottest engine operating conditions (e.g., take-off), when the greatest amount of cooling airflow is needed, an increased amount of air will flow through airflow aperture 208, and at cooler engine operating conditions (e.g., idle and cruise), when less cooling airflow is needed, less air will flow through airflow aperture 208.

Figure 3:
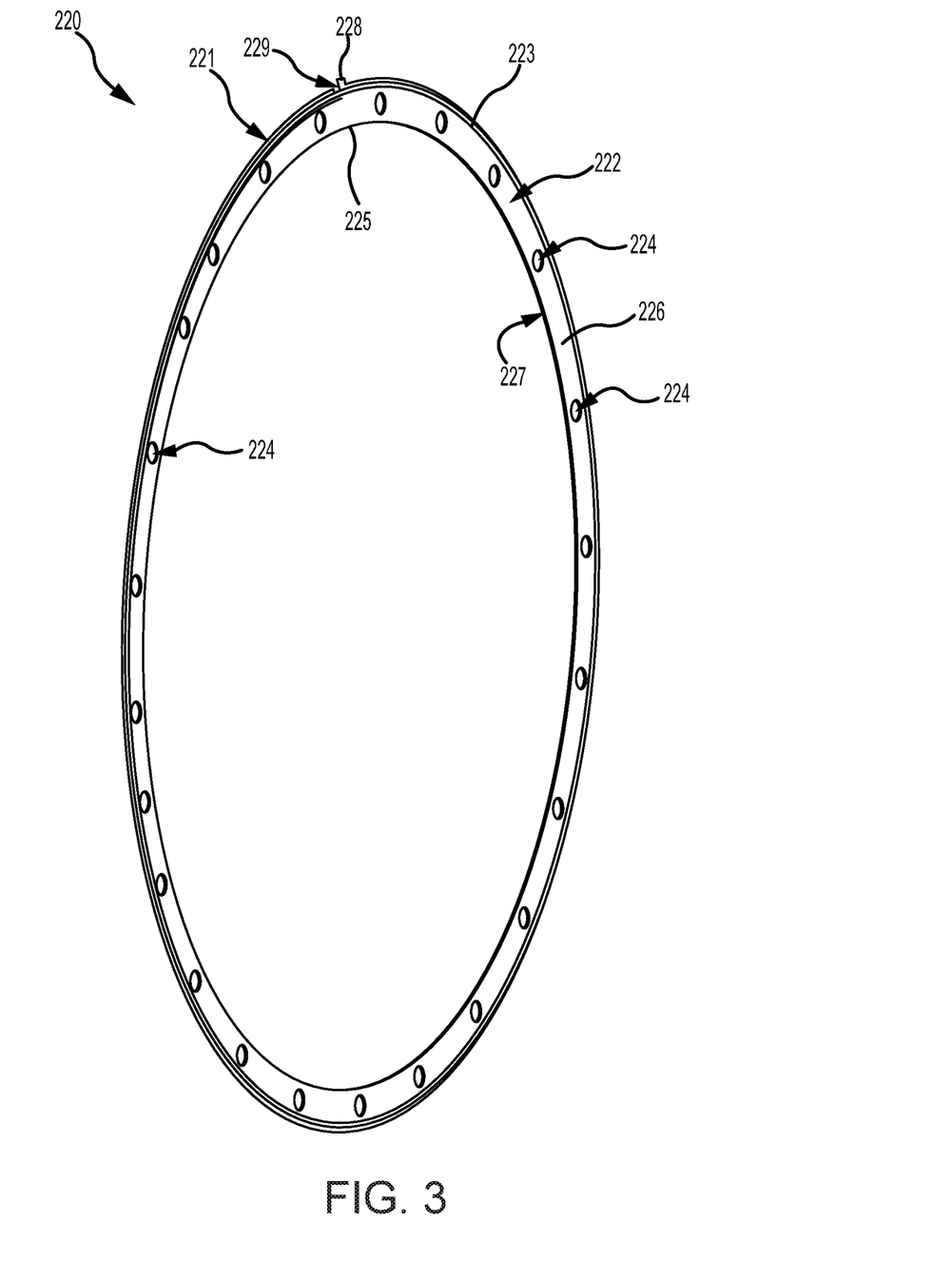
FIG. 3 illustrates a thermally responsive flow meter, in accordance with various embodiments.

With reference to FIG. 3, thermally responsive flow meter 220 is illustrated, in accordance with various embodiments. Thermally responsive flow meter 220 may comprise a generally annular or "ring" shaped structure. Thermally responsive flow meter 220 may include a coil 221 and a plate 222 coupled to coil 221. Coil 221 and plate 222 may comprise any suitable material, such as, for example, a nickel-based alloy. Plate 222 includes an OD surface 223 and an ID surface 225. Plate 222 further includes opposing radially extending surfaces 226 and 227, which each extend between OD surface 223 and ID surface 225. A plurality of airflow apertures 224 may be formed through plate 222. Stated differently, plate 222 defines a plurality of airflow apertures 224. In various embodiments, coil 221 may comprise a generally helical shape. In various embodiments, coil 221 may located circumferentially around the OD surface 223 of plate 222. A flange 228 may be located proximate a first end 229 of coil 221. Flange 228 may extend in a radially outward direction, or generally away from plate 222. In various embodiments, coil 221 may be located circumferentially about the ID surface 225 of plate 222, with flange 228 extending radially inward.

Figure 4A:
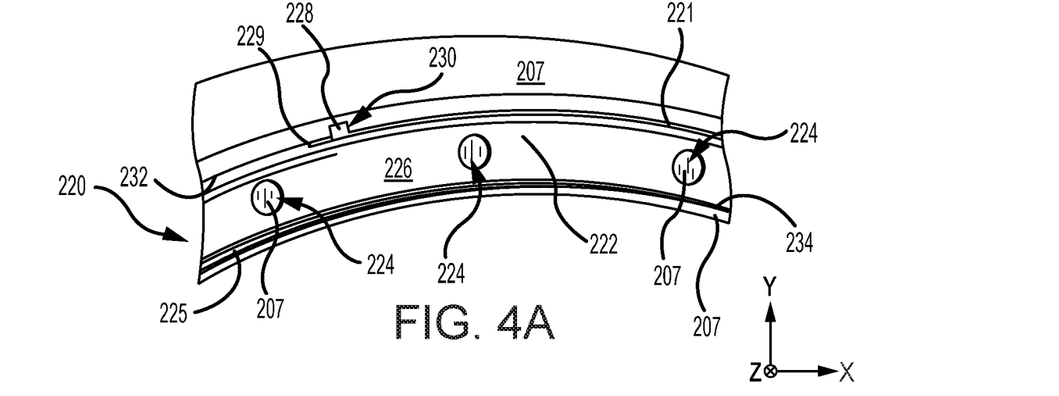
FIGS. 4A, 4B, and 4C illustrate the thermally responsive flow meter of FIG. 3 at various engine operating temperatures, in accordance with various embodiments.
Figure 4B:
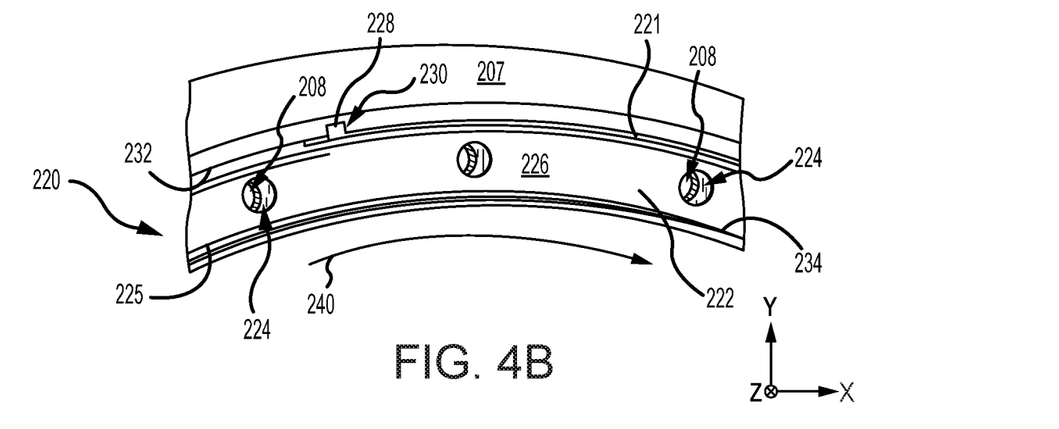
Figure 4C:
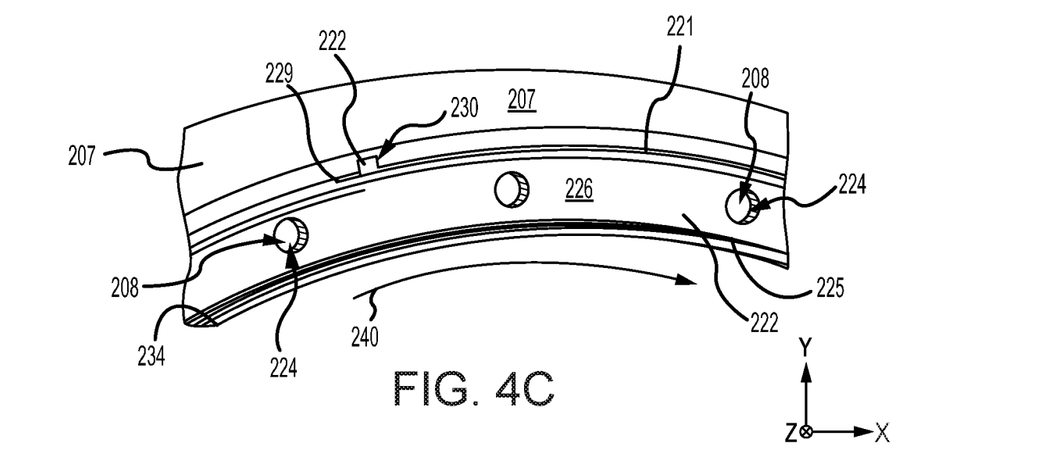

With reference to FIGS. 4A, 4B, and 4C, an aftward looking view of thermally responsive flow meter 220 coupled to flow guide 207 is illustrated at various engine temperatures, in accordance with various embodiments. In various embodiments, thermally responsive flow meter 220 may be coupled to flow guide 207. Thermally responsive flow meter 220 may be configured to adjust the flow of cooling fluid through airflow apertures 208, in response to changes in engine operating temperatures. In this regard, thermally responsive flow meter 220 may regulate airflow through airflow apertures 208 via thermal expansion and contraction of coil 221. For example, thermal expansion of coil 221 causes coil 221 and plate 222 to translate in a circumferential direction 240. Flow guide 207 may be configured to prevent or reduce thermal expansion of coil 221 and/or plate 222 in the radially outward and radially inward directions, thereby forcing coil 221 to translate in the circumferential direction. In this regard, a radially inward facing surface 232 of flow guide 207 may be in contact with coil 221 and a radially outward facing surface 234 of flow guide 207 may be in contact with ID surface 225 of plate 222. Radially inward facing surface 232 of flow guide 207 may define a slot 230. Slot 230 may be configured to engage flange 228, thereby restricting movement of first end 229.

With reference to FIG. 4A, thermally responsive flow meter 220 is illustrated in a covered position, in accordance with various embodiments. In various embodiments, thermally responsive flow meter 220 may be installed and/or configured such that at the coolest engine operating conditions, the greatest area of airflow apertures 208 will be covered by plate 222. In various embodiments, the greatest area of airflow apertures 208 may be covered, and/or airflow apertures 208 may be completely covered by plate 222, at lower power engine operating conditions, for example, in response to a temperature of the air along core flow-path C being less than approximately 800° F. (427° C.). As used in the present context only, "approximately" means ±30°.

With reference to FIG. 4B, thermally responsive flow meter 220 is illustrated in a partially covering position, in accordance with various embodiments. In various embodiments, coil 221 may be configured such that as engine power and temperatures increase, coil 221 will thermally expand, thereby causing plate 222 to translate in circumferential direction 240. Translation of plate 222 may cause a greater area of airflow apertures 208 to be exposed. Stated differently, increases in operating temperatures may cause a greater area of airflow apertures 208 to be overlapped by airflow apertures 224, thereby allowing increased cooling flow through airflow apertures 208. In various embodiments, coil 221 may be configured (e.g., a diameter of coil 221 may be selected) such that in response to the temperature of the air along core flow-path C increasing to greater than 800° F. (427° C.), the area of overlap between airflow apertures 224 and 208 will begin increasing.

With reference to FIG. 4C, thermally responsive flow meter 220 is illustrated in a fully open position, in accordance with various embodiments. In various embodiments, at the hottest engine operating conditions (e.g., take-off), the greatest amount of cooling airflow may be desirable. In this regard, coil 221 and plate 222 may be configured to axially align airflow apertures 224 with airflow apertures 208, at take-off or other maximum or near maximum thrust and/or power conditions, such that a relatively larger amount of air flows through airflow apertures 208 than at other thrust conditions and is provided to downstream components. In various embodiments, thermally responsive flow meter 220 may be configured to allow the greatest amount of cooling flow through airflow apertures 208, when a temperature of the air flowing along core flow-path C exceeds 1200° F. (649° C.).

After take-off, for example, during cruise, engine power demand and the temperature of the air along core flow-path C begin to generally decrease. The decreases in temperature may cause coil 221 to thermally contract. Contraction of coil 221 causes translation of plate 222 in a circumferential direction opposite circumferential direction 240, which may reduce the area of airflow apertures 208 exposed by airflow apertures 224 and the flow of cooling air through airflow apertures 208. Stated differently, thermally responsive flow meter 220 may be configured to misalign airflow apertures 224 relative to airflow apertures 208 in response to a decrease in engine temperature.

Figure 5:
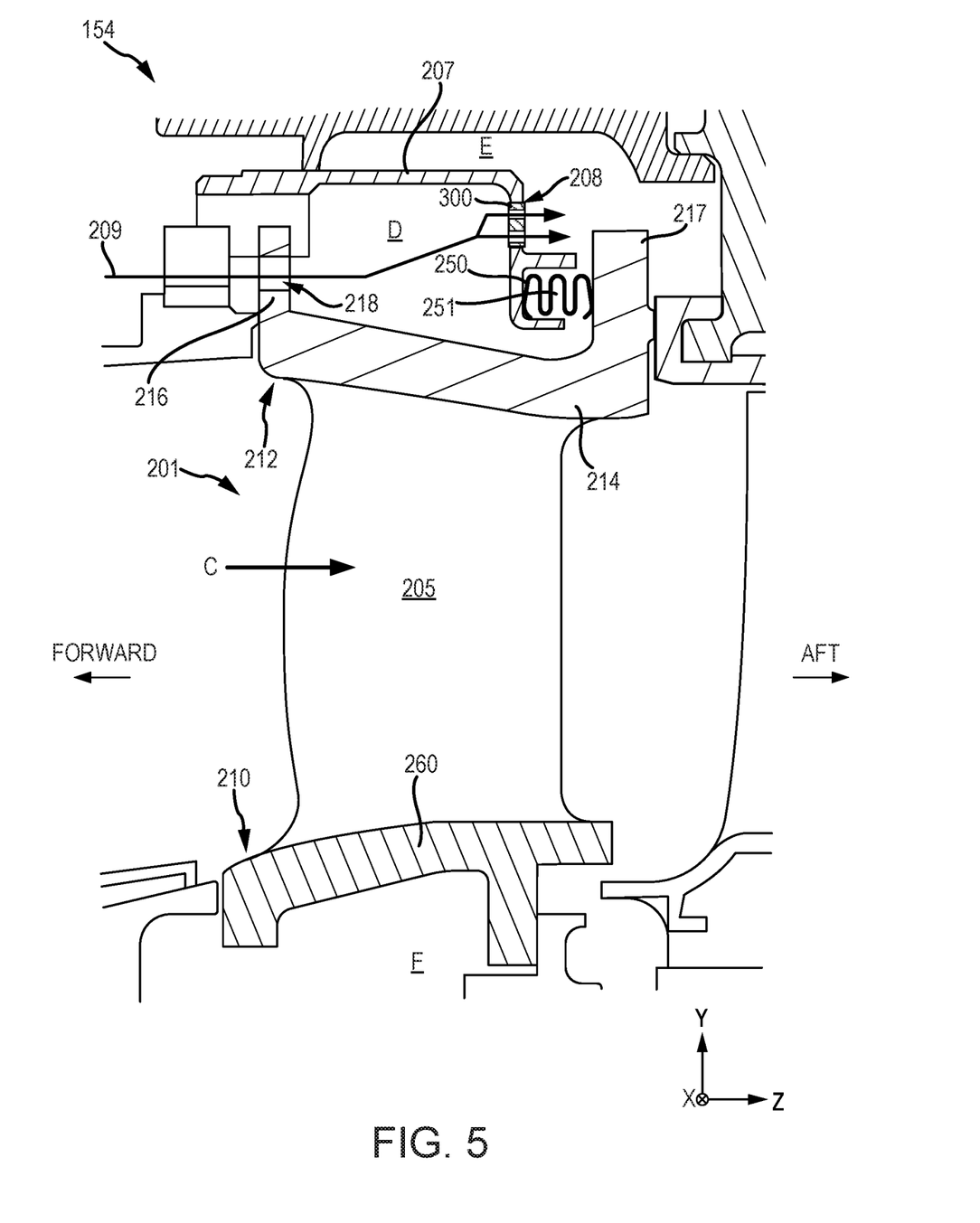
FIG. 5 illustrates a cross-section view of a high pressure turbine section of a gas turbine engine having a thermally responsive flow meter, in accordance with various embodiments.

With reference to FIG. 5, high pressure turbine 154 having a thermally responsive flow meter 300 is depicted, in accordance with various embodiments. Thermally responsive flow meter 300 may be located in airflow aperture 208. While thermally responsive flow meter 300 and thermally responsive flow meter 220 (FIG. 2) are shown regulating airflow through airflow aperture 208 in high pressure turbine 154, it should be understand that thermally responsive flow meters of the present disclosure may be employed in other engine sections and components (e.g., in compressor section 124 and/or in lower pressure turbine 146) and/or with other airflow apertures. For example, in various embodiments, a thermally responsive flow meter may be coupled to OD forward rail 216 to regulate flow through forward rail airflow aperture 218. In various embodiments, a thermally responsive flow meter may be disposed proximate ID stator vane rail 210, for example, at a first tangential onboard injector (TOBI), to regulate flow to ID engine components.

During operation, increases in engine temperature and in the temperature of the air in core flow-path C, may cause the temperature of cooling air in secondary airflow path 209 to increase. In response to increases in the temperature of cooling air in secondary airflow path 209, thermally responsive flow meter 300 may translate to allow an increased volume of cooling air to flow through airflow aperture 208. In response to decreases in the temperature of cooling air in secondary airflow path 209, thermally responsive flow meter 300 may translate to decrease the amount of cooling air flowing through airflow apertures 208. In this regard, thermally responsive flow meter 300 may be installed and/or configured such that at the hottest engine operating conditions (e.g., take-off), when the greatest amount of cooling airflow is needed, a maximum or increased amount of air will flow through airflow apertures 208, and at cooler engine operating conditions (e.g., idle and cruise), when less cooling airflow is needed, less air will flow through airflow apertures 208.

Figure 6A:
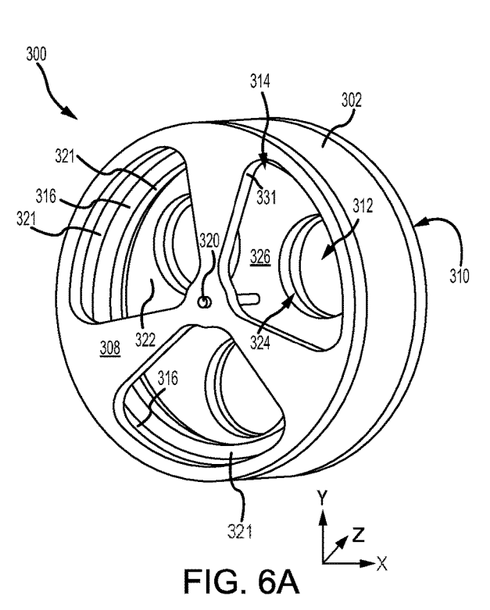
FIGS. 6A and 6B illustrate, respectively, a perspective view and a cross-section view of a thermally responsive flow meter, in accordance with various embodiments.
Figure 6B:
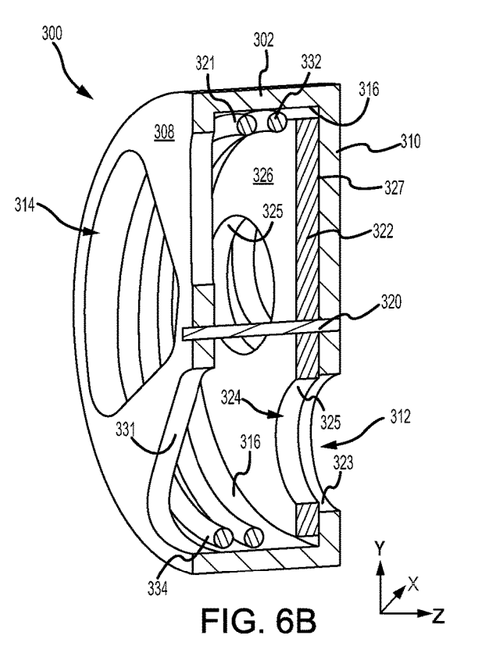

With reference to FIGS. 6A and 6B, thermally responsive flow meter 300 is illustrated, in accordance with various embodiments. Thermally responsive flow meter 300 may comprise a generally cylindrically shaped structure. Thermally responsive flow meter 300 may include a coil 321 and a plate 322 coupled to coil 321. Coil 321 and plate 322 may be disposed within a housing 302 of thermally responsive flow meter 300. Housing 302 may be configured to be press fit within airflow aperture 208, with momentary reference to FIG. 5. Coil 321, plate 322, and housing 302 may comprise any suitable material, such as, for example, a nickel-based alloy.

Housing 302 includes an inlet face 308 and an outlet face 310. An axle 320 may extend between inlet face 308 and outlet face 310. Plate 322 may be configured to rotate (i.e., translate circumferentially) about axle 320. A plurality of inlet airflow apertures 314 may be formed through inlet face 308. Stated differently, inlet face 308 (e.g., surface 331) may define inlet airflow apertures 314. A plurality of outlet airflow apertures 312 may be formed through outlet face 310. Stated differently, outlet face 310 (e.g., surface 323) may define outlet airflow apertures 312.

A plurality of airflow apertures 324 may be formed through plate 322. Stated differently, plate 322 (e.g., surface 325) defines a plurality of airflow apertures 324. Plate 322 includes opposing radially extending surfaces 326 and 327. Radially extending surface 327 may be oriented toward and located proximate outlet face 310 of housing 302. Radially extending surface 326 may be oriented toward inlet face 308 of housing 302. Coil 321 may be located over radially extending surface 326. In this regard, coil 321 may be located between plate 322 and inlet face 308 of housing 302. Coil 321 may comprise a generally helical shape. Coil 321 may be configured to bias plate 322 toward and/or into contact with outlet face 310. A first end 332 of coil 321 may be coupled to plate 322. A second end 334 of coil 321 may be coupled to housing 302.

Figure 7A:
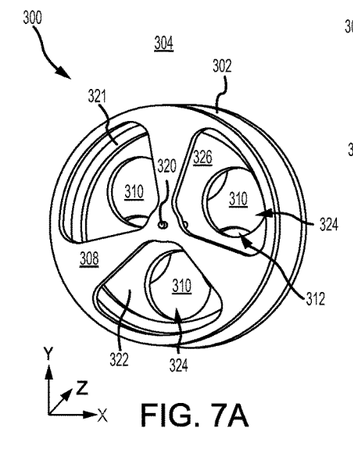
FIGS. 7A, 7B, and 7C illustrate the thermally responsive flow meter of FIGS. 6A and 6B at various engine operating temperatures, in accordance with various embodiments.
Figure 7B:
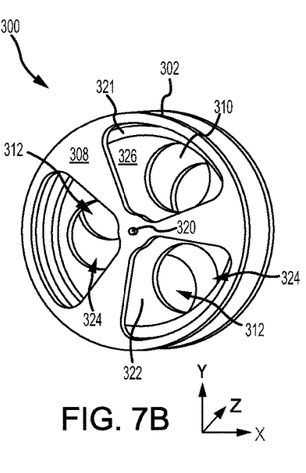
Figure 7C:
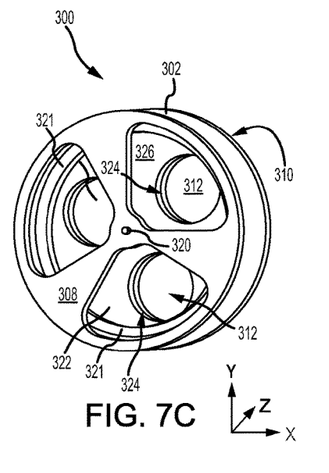

With reference to FIGS. 7A, 7B, and 7C, an aftward looking view of thermally responsive flow meter 300 is illustrated at various engine temperatures, in accordance with various embodiments. Thermally responsive flow meter 300 may be configured to adjust the flow of cooling fluid through airflow apertures 208, with momentary reference to FIG. 5, in response to changes in temperature of air flowing along core flow-path C. In this regard, thermally responsive flow meter 300 may regulate airflow through outlet airflow apertures 312 via thermal expansion and contraction of coil 321. For example, thermal expansion of coil 321 may cause coil 321 and plate 322 to translate circumferentially about axle 320. In various embodiments, housing 302 may be configured to prevent or reduce thermal expansion of coil 321 and/or plate 322 in the radially outward direction and axle 320 may prevent or reduce thermal expansion of coil 321 and/or plate 322 in the radially inward direction, thereby forcing coil 321 to translate in the circumferential direction. A radially inward facing surface 316 of housing 302 may be in contact with coil 321. Second end 334 of coil 321 may be coupled or otherwise fixed to housing 302, thereby restricting movement of second end 334.

With reference to FIG. 7A, thermally responsive flow meter 300 is illustrated in a covered position, in accordance with various embodiments. In various embodiments, thermally responsive flow meter 300 may be installed and/or configured such that the greatest area of outlet airflow apertures 312 will be covered by plate 322, at the coolest engine operating conditions. In various embodiments, the greatest area of outlet airflow apertures 312 may be covered by plate 322, and/or outlet airflow apertures 312 may be completely covered by plate 322, at lower power engine operating conditions, for example, when air flowing along core flow-path C is less than approximately 800° F. (427° C.). As used in the present context only, "approximately" means ±30°.

With reference to FIG. 7B, thermally responsive flow meter 300 is illustrated in a partially covered position, in accordance with various embodiments. In various embodiments, coil 321 may be configured (e.g., a diameter of coil 321 is selected) such that as engine power and temperatures increase, for example, when a temperature of the air flowing along core flow-path C exceeds 800° F. (427° C.), coil 321 will thermally expand, thereby causing plate 322 to translate circumferentially about axle 320. Translation of plate 322 may cause a greater area of outlet airflow apertures 312 to be exposed. Stated differently, increases in operating temperatures may cause a greater area of outlet airflow apertures 312 to be overlapped by airflow apertures 324 (i.e., a decreased area of outlet airflow apertures 312 is covered by plate 322), thereby allowing increased cooling flow through outlet airflow apertures 312 and airflow apertures 208, with momentary reference to FIG. 5.

With reference to FIG. 7C, thermally responsive flow meter 300 is illustrated in a fully open position, in accordance with various embodiments. In various embodiments, at the hottest engine operating conditions (e.g., take-off), the greatest amount of cooling airflow may be desirable. In this regard, coil 321 and plate 322 may be configured to axially align airflow apertures 324 with outlet airflow apertures 312, at take-off or other maximum or near maximum thrust and/or power conditions, such that a relatively larger amount of air flows through outlet airflow apertures 312, and thus through airflow apertures 208, than at other thrust conditions. In various embodiments, thermally responsive flow meter 300 may be configured to allow the greatest amount of cooling flow through outlet airflow apertures 312 and airflow apertures 208, when a temperature of the air flowing along core flow-path C exceeds 1200° F. (649° C.).

After take-off, for example, during cruise, engine power demand and the temperature of the air along core flow-path C begin to generally decrease. The decreases in temperature may cause coil 321 to thermally contract. Contraction of coil 321 causes a translation of plate 322 about axle 320, which may reduce the area of outlet airflow apertures 312 exposed by airflow apertures 324 (i.e., may increase the area of outlet airflow apertures 312 covered by plate 322), thereby reducing the flow of cooling air through airflow apertures 208. Stated differently, thermally responsive flow meter 300 may be configured to misalign airflow apertures 324 relative to outlet airflow apertures 312 in response to a decrease in engine temperature. Decreasing the amount of air dedicated to cooling may increase the volume of air available for use in the engine core for power generation, which may increase engine and fuel efficiency.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermally responsive flow meter for a gas turbine engine, comprising:
a coil; and
a plate coupled to the coil, the plate including
a first airflow aperture formed through a first surface of the plate and
a second surface of the plate, the first surface and the second surface each extending radially relative to a central longitudinal axis of the gas turbine engine, wherein
the coil is coupled to at least one of an inner diameter or an outer diameter of the plate, and wherein the second surface of the plate is oriented away from the first surface, and wherein the plate is coupled to the coil such that the first surface and the second surface of the plate translate in a circumferential direction in response to a thermal expansion of the coil to regulate a flow of cooling air through a flow guide of the gas turbine engine.

2. The thermally responsive flow meter of claim 1, wherein the plate comprises an annular structure, and wherein the first surface and the second surface of the plate extend radially between the inner diameter and the outer diameter of the plate.

3. The thermally responsive flow meter of claim 2, wherein the coil is located at the outer diameter of the plate such that the plate extends radially inward from the coil.

4. The thermally responsive flow meter of claim 3, further comprising a flange extending radially outward from a first end of the coil.

5. The thermally responsive flow meter of claim 1, further comprising a housing disposed around the plate and the coil, wherein a first face of the housing defines a second airflow aperture.

6. The thermally responsive flow meter of claim 5, wherein the coil is located between the plate and a second face of the housing, and wherein the coil biases the plate toward the first face of the housing.

7. The thermally responsive flow meter of claim 6, further comprising an axle extending between the first face of the housing and the second face of the housing, wherein the coil is configured to translate the plate about the axle.

8. An engine section of a gas turbine engine, comprising:
a flow guide configured to receive a cooling airflow, the flow guide defining a first airflow aperture; and
a thermally responsive flow meter coupled to the flow guide, the thermally responsive flow meter including:
a coil; and
a plate coupled to the coil, the plate including a second airflow aperture formed through a first radially extending surface of the plate and a second radially extending surface of the plate, the first radially extending surface and the second radially extending surface each extending in a radial direction relative to a central longitudinal axis of the gas turbine engine, the second radially extending surface of the plate being oriented away from the first radially extending surface of the plate, wherein the plate is coupled to the coil such that the first radially extending surface of the plate, the second radially extending surface of the plate, and the second airflow aperture translate in a circumferential direction in response to a change in temperature of the cooling airflow.

9. The engine section of claim 8, wherein the thermally responsive flow meter is configured to align the second airflow aperture with the first airflow aperture at a first flight condition and to misalign the second airflow aperture relative the first airflow aperture at a second flight condition.

10. The engine section of claim 9, wherein the first flight condition comprises a take-off condition and the second flight condition comprises a cruise condition.

11. The engine section of claim 8, wherein
thermal expansion of the coil results in translation of the plate in the circumferential direction.

12. The engine section of claim 11, wherein the coil is located at an outer diameter of the plate.

13. The engine section of claim 12, further comprising a flange extending from the coil, wherein a slot defined by the flow guide engages the flange.

14. The engine section of claim 11, wherein the thermally responsive flow meter further comprises a housing located around the coil and the plate.

15. The engine section of claim 14, wherein the housing is press fit within the first airflow aperture.

16. A gas turbine engine, comprising:
a combustor section; and
a turbine section downstream of the combustor section, the turbine section comprising:
a flow guide configured to receive an airflow and defining, at least, a portion of an airflow path through the turbine section, wherein the flow guide further defines a first airflow aperture, and
a thermally responsive flow meter coupled to the flow guide, the thermally responsive flow meter including a plate, the plate comprising a radially extending surface, the radially extending surface extending in a radial direction relative to a central longitudinal axis of the gas turbine engine, wherein the radially extending surface of the plate defines a second airflow aperture, wherein the thermally responsive flow meter is configured to translate the radially extending surface of the plate and the second airflow aperture circumferentially in response to a change in temperature of the airflow.

17. The gas turbine engine of claim 16, wherein the thermally responsive flow meter further comprises a coil coupled to plate the plate, wherein thermal expansion of the coil results in circumferential translation of the plate about the central longitudinal axis of the gas turbine engine.

18. The gas turbine engine of claim 17, wherein a first surface of the flow guide restricts radially outward translation of the coil, the first surface extending circumferentially about the flow guide, and wherein a second surface of the flow guide restricts radially inward translation of the plate, the second surface extending circumferentially about the flow guide.

19. The gas turbine engine of claim 17, wherein the coil is located radially outward of the radially extending surface of the plate.

20. The gas turbine engine of claim 19, wherein the thermally responsive flow meter further comprises a housing disposed around the coil and the plate, and wherein the coil is configured to bias the plate toward a radially extending face of the housing, the radially extending face defining a third airflow aperture.

\* \* \* \* \*

UNITED STATES PATENT AND TRADEMARK OFFICE
CERTIFICATE OF CORRECTION

PATENT NO. : 11,248,490 B2
APPLICATION NO. : 16/004687
DATED : February 15, 2022
INVENTOR(S) : Nathan K. Galle It is certified that error appears in the above-identified patent and that said Letters Patent is hereby corrected as shown below:

In the Claims

Claim 17, Column 12, Line 51, after "coupled to" please delete the word "plate"

Signed and Sealed this
Seventh Day of June, 2022

*Katherine Kelly Vidal*

Katherine Kelly Vidal
*Director of the United States Patent and Trademark Office*